United States Patent
Ehrlich et al.

(10) Patent No.: US 9,707,955 B2
(45) Date of Patent: Jul. 18, 2017

(54) METHOD FOR PROPELLING A VEHICLE

(71) Applicant: VOLVO TRUCK CORPORATION, Göteborg (SE)

(72) Inventors: Lisa Ehrlich, Mölnlycke (SE); Bertrand Molimard, Västra Frölunda (SE); Johan Bringhed, Västra Frölunda (SE); Anders Heiwall, Lerum (SE)

(73) Assignee: Volvo Truck Corporation, Göteborg (SE)

( * ) Notice: Subject to any disclaimer, the term of this patent is extended or adjusted under 35 U.S.C. 154(b) by 60 days.

(21) Appl. No.: 14/766,768

(22) PCT Filed: Feb. 11, 2013

(86) PCT No.: PCT/EP2013/000398
§ 371 (c)(1),
(2) Date: Aug. 10, 2015

(87) PCT Pub. No.: WO2014/121807
PCT Pub. Date: Aug. 14, 2014

(65) Prior Publication Data
US 2016/0001763 A1   Jan. 7, 2016

(51) Int. Cl.
*B60L 9/00* (2006.01)
*B60L 11/00* (2006.01)
(Continued)

(52) U.S. Cl.
CPC ............ *B60W 20/10* (2013.01); *B60K 6/48* (2013.01); *B60W 10/06* (2013.01); *B60W 10/08* (2013.01);
(Continued)

(58) Field of Classification Search
USPC ....................................................... 701/1, 22
See application file for complete search history.

(56) References Cited

U.S. PATENT DOCUMENTS

2002/0052677 A1* 5/2002 Lasson ................... B60K 6/365
701/22
2002/0063002 A1* 5/2002 Lasson ..................... B60K 6/28
180/65.235
(Continued)

FOREIGN PATENT DOCUMENTS

DE       101 63 382 A1   7/2002
EP       2 226 227 A1    9/2010
(Continued)

OTHER PUBLICATIONS

Japanese Official Action (Nov. 11, 2016) for corresponding Japanese App. 2015-556398.
(Continued)

*Primary Examiner* — Ronnie Mancho
(74) *Attorney, Agent, or Firm* — WRB-IP LLP

(57) ABSTRACT

A method is provided for propelling a vehicle having a power-train including a primary power source accompanied with a primary power torque curve and a secondary power source accompanied with a secondary power torque curve, the primary power source being adapted to deliver a maximum torque output in relation to rotational speed according to the primary power torque curve and the secondary power source being adapted to deliver a maximum torque output in relation to rotational speed according to the secondary power torque curve, the vehicle being adapted to be propelled by either one of the primary power source and the secondary power source or by both together, the powertrain further including a powertrain limit curve which is adapted to where applicable to restrict a current driver demand from a driver of the vehicle in relation to the primary power torque curve and the secondary power torque curve when propelling the vehicle. The method includes, when propelling the vehicle by both the primary power source and the secondary power source: determining a current driver (Continued)

demand, determining a current propulsion adaption condition for the vehicle, adjusting the powertrain limit curve according to a propulsion adaption torque factor depending on the current propulsion adaption condition, where applicable restricting the current driver demand according to the adjusted powertrain limit curve, and requesting the powertrain to propel the vehicle according to the thus possibly restricted current driver demand. A vehicle adapted to perform the method is also provided.

15 Claims, 4 Drawing Sheets

(51) Int. Cl.
| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60W 20/10* | (2016.01) | |
| *B60K 6/48* | (2007.10) | |
| *B60W 50/10* | (2012.01) | |
| *B60W 30/188* | (2012.01) | |
| *B60W 10/06* | (2006.01) | |
| *B60W 10/08* | (2006.01) | |
| *B60W 50/00* | (2006.01) | |

(52) U.S. Cl.
CPC .......... *B60W 30/188* (2013.01); *B60W 50/10* (2013.01); *B60W 2050/0026* (2013.01); *B60W 2530/10* (2013.01); *B60W 2540/10* (2013.01); *B60W 2550/142* (2013.01); *B60W 2560/00* (2013.01); *B60W 2710/0644* (2013.01); *B60W 2710/0666* (2013.01); *B60W 2710/081* (2013.01); *B60W 2710/083* (2013.01); *Y02T 10/6221* (2013.01); *Y02T 10/7258* (2013.01); *Y10S 903/93* (2013.01)

(56) References Cited

U.S. PATENT DOCUMENTS

| | | | |
|---|---|---|---|
| 2002/0065589 A1* | 5/2002 | Ostberg | B60K 6/445 701/22 |
| 2003/0160455 A1 | 8/2003 | Hu et al. | |
| 2005/0211479 A1 | 9/2005 | Tamor | |
| 2007/0157899 A1* | 7/2007 | Seufert | B60K 6/387 123/179.25 |
| 2009/0118918 A1* | 5/2009 | Heap | B60K 6/365 701/54 |
| 2009/0118920 A1* | 5/2009 | Heap | B60K 6/365 701/54 |
| 2009/0118968 A1* | 5/2009 | Livshiz | F02D 11/105 701/102 |
| 2010/0222953 A1* | 9/2010 | Tang | B60L 15/2036 701/22 |
| 2011/0139117 A1* | 6/2011 | Kar | F02D 11/105 123/395 |
| 2014/0195080 A1* | 7/2014 | Lehmen | B60W 10/00 701/22 |
| 2015/0134160 A1* | 5/2015 | Liang | B60W 10/06 701/22 |
| 2015/0224845 A1* | 8/2015 | Anderson | B60G 17/019 701/37 |
| 2015/0251657 A1* | 9/2015 | Johri | B60L 7/10 701/22 |
| 2015/0367831 A1* | 12/2015 | West | B60W 10/04 701/22 |

FOREIGN PATENT DOCUMENTS

| | | |
|---|---|---|
| FR | 2 799 417 A1 | 4/2001 |
| JP | H08019114 | 1/1996 |
| JP | 2000025490 | 1/2000 |
| JP | 2001065382 | 3/2001 |
| JP | 2008143426 | 6/2008 |

OTHER PUBLICATIONS

International Search Report (Oct. 16, 2013) for corresponding International App. PCT/EP2013/000398.
Japanese Official Action (Apr. 28, 2017) for corresponding Japanese App. 2015-556398.

\* cited by examiner

METHOD FOR PROPELLING A VEHICLE

BACKGROUND AND SUMMARY

The present disclosure relates to a method for propelling a vehicle having a power-train comprising a primary power source accompanied with a primary power torque curve and a secondary power source accompanied with a secondary power torque curve, the primary power source being adapted to deliver a maximum torque output in relation to rotational speed according to said primary power torque curve and the secondary power source being adapted to deliver a maximum torque output in relation to rotational speed according to said secondary power torque curve, the vehicle being adapted to be propelled by either one of the primary power source and the secondary power source or by both together, the powertrain further comprising a powertrain limit curve which is adapted to where applicable restrict a current driver demand from a driver of the vehicle in relation to said primary power torque curve and said secondary power torque curve when propel-ling the vehicle. The present disclosure also relates to a vehicle which is adapted to perform the method.

In the automotive industry the general trend is to reduce fuel consumption end exhaust gas emissions in the vehicles, especially in commercial vehicles having internal combustion engines. This is also true however for passenger cars, busses etc. This may be achieved in many different ways. One strategy has been to reduce the engine size in general. However there may be times when such a downsized engine is not sufficient to deliver the required torque to propel the vehicle. This is especially true when the vehicle, such as a commercial vehicle in cargo traffic or a construction type of vehicle, is heavily loaded. In combination with a downsized engine also a secondary and further assistance motor(s) can be implemented, which is (are) adapted to assist the main engine at times when the power demand delivered by the main engine is insufficient.

One way to complement a downsized internal combustion engine may be to utilize a secondary power source in combination with an energy buffer. These vehicles that combine several power sources are referred to as hybrid vehicles. One example of a secondary power source and energy buffer is an electric machine and battery set. When a vehicle combines an internal combustion engine with an electric machine and a battery set they are referred to as hybrid electric vehicles. The battery sets are increasingly improved in efficiency, power and life time properties. The electric machine may be run both as a generator to store energy in the battery set at times when there is a surplus of energy (such as during deceleration sequences for example), and as a motor to propel the vehicle by delivering energy from the battery set to the vehicle wheels. The vehicle may be run on either one or both of the internal combustion engine and the electric machine. The internal combustion engine may be run on any type of commercially available fuel, although diesel still is the most common fuel for vehicles such as heavy trucks.

The electric machine is often designed to give good performance properties when propelling the vehicle in a purely electric mode as well as to meet demands on fuel economy, such that high brake energy regeneration is achieved. When driving the vehicle in hybrid mode, i.e. by utilising both the internal combustion engine and the electric machine, the power output from the electric machine is consequently limited. There are several reasons for running the electric machine on a limited capacity under such conditions. It is advantageous to limit the vehicle acceleration such that the vehicle behaves in a similar manner as a non-hybrid vehicle and so that the acceleration is not too powerful. It is also advantageous not to use too much electric power for saving the battery lifespan. It is also advantageous not to overheat the electric machine, which otherwise could be the case.

It is noted that hybrid vehicles also may be of other kinds. The general term hybrid vehicle is used when a vehicle combines a primary power source with a secondary power source. It also needs an energy buffer or an energy storage system. The primary power source may be any kind of internal combustion engine, such as running on diesel, petrol, dimethylether or other appropriate fuel or fuel combination. The secondary power source may be an electric machine, but also a flywheel or a hydraulic motor. The hybrid vehicle would hence be called a mechanical hybrid vehicle and a hydraulic hybrid vehicle respectively. The energy buffer or energy storage system for the electric machine may be a battery set or a super capacitor, whereas for the flywheel it is the moment of inertia which is stored in the flywheel, and for the hydraulic motor it is a pressure tank.

It is desirable to further improve the drivability of a hybrid vehicle.

According to a first aspect a method for propelling a vehicle is disclosed. The vehicle has a powertrain comprising a primary power source accompanied with a primary power torque curve and a secondary power source accompanied with a secondary power torque curve. The primary power source is adapted to deliver a maximum torque output in relation to rotational speed according to said primary power torque curve and the secondary power source is adapted to deliver a maximum torque output in relation to rotational speed according to said secondary power torque curve. The vehicle is adapted to be propelled by either one of the primary power source and the secondary power source or by both together. The powertrain further comprises a powertrain limit curve which is adapted to where applicable restrict a current driver demand from a driver of the vehicle in relation to said primary power torque curve and said secondary power torque curve when propelling the vehicle. The method comprises when propelling the vehicle by both the primary power source and the secondary power source:

determining a current driver demand, determining a current propulsion adaption condition for the vehicle, adjusting the powertrain limit curve according to a propulsion adaption torque factor depending on said current propulsion adaption condition, where applicable restricting said current driver demand according to said adjusted powertrain limit curve, and requesting the powertrain to propel the vehicle according to the thus possibly restricted current driver demand.

A method of propelling a vehicle of this kind adjusts the power that is available from the powertrain to propel the vehicle such that the propulsion of the vehicle is adjusted accordingly. Under normal propulsion conditions, the power needed to propel the vehicle may be kept at a "normal" level or at a "standard setting" in order to take fuel economy, exhaust gas emissions and to capacities for each one of the primary and secondary power sources into account. However, it may be advantageous and desirous to adjust the power that is made available to the propulsion of the vehicle through adjusting the power-train limit curve. Hereby a quick response from the vehicle to the driver's commands may be achieved, or additional power may be utilised. The opposite situation may also apply, i.e. that a slower response or less power is made available for propelling the vehicle. A more fine-tuned cooperation between the primary power source and the secondary power source may consequently be achieved. This may also improve the lifetime of any battery sets or similar additional features if such are included in the powertrain.

Determining a prevailing propulsion adaption condition is an advantageous manner in which to determine under what circumstances the vehicle travels. Hereby the propulsion of the vehicle may be adapted to the prevailing propulsion conditions, i.e. to the prevailing total power demand for the vehicle. The propulsion adaption torque factor is a function of the prevailing propulsion adaption condition. Hereby the efficiency of the propulsion of the vehicle may be balanced against the power consumption needed for the propulsion. Different prevailing propulsion conditions may consequently result in different propulsion adaption torque factors, or the adjusting of a propulsion adaption torque factor, continuously or stepwise where appropriate.

According to an embodiment the propulsion adaption torque factor is a scaling factor being a function of the prevailing propulsion adaption condition.

This is a simple manner to take the prevailing propulsion adaption conditions into account and to adjust the powertrain limit curve.

According to an embodiment the scaling factor is stepwise linear.

According to an embodiment the step of requesting the powertrain to propel the vehicle according to the thus possibly restricted current driver demand involves transforming said possibly restricted current driver demand into a powertrain torque demand.

According to an embodiment the method further comprises distributing said power-train torque demand between the primary power source and the secondary power source.

According to an embodiment the method comprises resetting the powertrain limit curve when the prevailing propulsion adaption condition is terminated.

In order to minimise e.g. the additional power consumption by the electric machine which may be into effect during a prevailing propulsion adaption condition, the powertrain limit curve may be reset as soon as e.g. a prevailing propulsion adaption condition is terminated. Thereby the powertrain capacity is used most efficiently. This behaviour may be advantageous when the propulsion adaption torque factor has a discontinuous constitution, e.g. being limited to adjust the powertrain limit curve at only certain times such as when a particular event occurs.

According to an embodiment the step of detecting a prevailing propulsion adaption condition for the vehicle comprises detecting any one or a combination of the following: detecting that the vehicle is located in or at a slope, detecting a loading situation of the vehicle, and detecting that the vehicle is being ahead of or belated in relation to a desired schedule.

These conditions may require additional power to propel the vehicle and it is hence advantageous to detect if any of them prevail, either alone or in combination. The detection may be performed continuously during using of the vehicle. This means that it can be made both when the vehicle is propelled and at a standstill. It may also be made when both the primary power source and the secondary power source are briefly "shut off since that may occur at a standstill if the vehicle is provided with a start/stop functionality. A typical situation of that kind is a bus in commercial traffic which stops at a bus stop for letting travellers on and off, or when a vehicle stops at a traffic signal.

According to an embodiment the step of detecting that the vehicle is located in or at a slope involves using inclination detecting means and detecting if the inclination sens-ing means detect an upward or downward slope being equal to or greater than a predetermined inclination value.

Such inclination detecting means may include an inclination sensor located in the vehicle, a vehicle navigation system such as a Global Positioning System (GPS) system having access also to information of altitudes, or a vehicle navigation system such as a GPS system, which is adapted to record the altitude of a position if the vehicle passes said location in order to use the altitude information the next time the same location is passed.

According to an embodiment said predetermined inclination value corresponds to an upward slope of at least 7.5%, preferably of at least 10%, and more preferably of at least 12.5%.

According to an embodiment the step of detecting a loading situation of the vehicle involves using weight sensing means and detecting that the weight sensing means detect a payload in the vehicle being equal or greater than a predetermined weight value.

Such weight sensing means may include gauges of different kinds located in or at a vehicle suspension system, such that the additional payload on the suspension system may be estimated in relation to the vehicle dead weight.

According to an embodiment said predetermined weight value corresponds to a payload of 30%, preferably of 50%, and more preferably of 70% in relation to a vehicle dead weight.

According to a second aspect a vehicle is disclosed which has a powertrain comprising a primary power source accompanied with a primary power torque curve and a secondary power source accompanied with a secondary power torque curve. The primary power source is adapted to deliver a maximum torque output in relation to rotational speed according to said primary power torque curve and the secondary power source is adapted to deliver a maximum torque output in relation to rotational speed according to said secondary power torque curve. The vehicle is adapted to be propelled by either one of the primary power source and the secondary power source or by both together. The powertrain further comprises a powertrain limit curve which is adapted to where applicable restrict a current driver demand from a driver of the vehicle in relation to said primary power torque curve and said secondary power torque curve when propelling the vehicle. The vehicle is further adapted to perform the method as disclosed above. A vehicle of this kind is associated with corresponding advantages as are disclosed in relation to the method according to the first aspect.

According to an embodiment the primary power source is an internal combustion engine.

According to an embodiment the secondary power source is an electric machine.

BRIEF DESCRIPTION OF THE DRAWINGS

In the following the invention will be described in relation to a non-limiting embodiment with reference to the accompanying drawings, in which.

DETAILED DESCRIPTION

The description starts with the disclosure of the powertrain of a vehicle which uti-lises the present disclosure, and continues with the description of the disclosed system and method as such.

A vehicle of the kind that is relevant for the present disclosure is any type of vehicle which may be propelled by a primary power source 2. An example of such a vehicle is a truck, such as a heavy truck in cargo transport. Other types of vehicles may i. a. be any type of truck, bus or passenger car.

Figure 1:
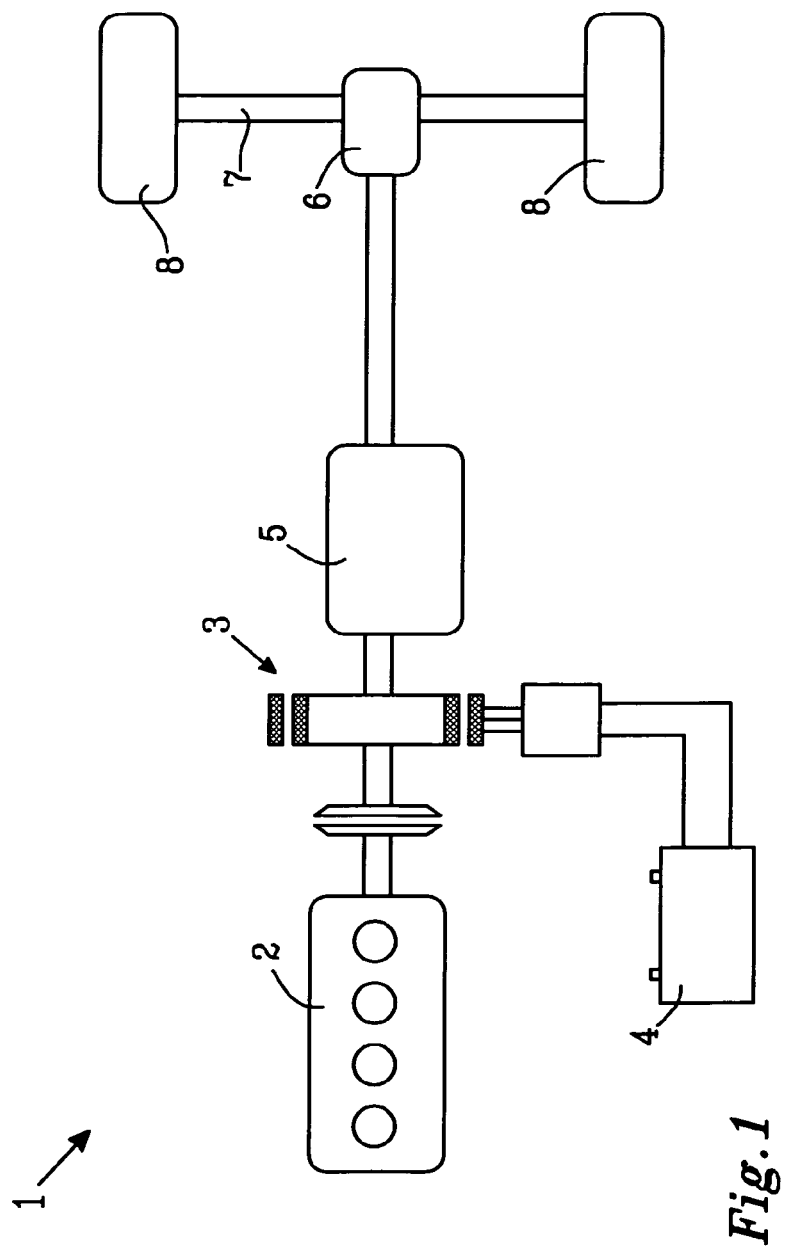
FIG. 1 is a schematical representation of a powertrain according to one embodiment of the invention.

Starting with reference to FIG. 1, an exemplary powertrain 1 in a vehicle which is suitable for performing the disclosed method includes a primary power source 2. One embodiment of a primary power source 2 is an internal combustion engine 2. The internal combustion engine 2 is normally a diesel engine of a generally known type. Internal combustion engines 2 running on other types of fuel are also possible, such as running on petrol, natural gas or dimethylether. The powertrain 1 also includes an electric machine 3 which comes with a battery 4 or a set of batteries 4. The electric machine 3 is one type of secondary power source 3. The battery or set of batteries is one type of energy buffer or energy storage system according to the disclosure. The vehicle is adapted to be propelled by either the internal combustion engine 2 alone, by the electric machine 3 alone, or by both together. A vehicle of this kind is often referred to as a hybrid electric vehicle.

The powertrain 1 also comprises a transmission with a gear box 5 having a number of speed-changing gears which is known per se, such that the rotational speed or torque of the internal combustion engine 2 and the electric machine 3 is adapted to the prevailing conditions and is transmitted to the wheel axle 7 through a differential gear 6, and to the driving wheels 8 of the vehicle. The invention is disclosed in relation to a vehicle having two-wheel drive, but the vehicle could also be utilised in combination with a multi-wheel drive type of vehicle. Generally, the combination of a primary power source 2 with a secondary power source 3 in the powertrain 1 may be different from the combination as it is disclosed in FIG. 1. These combinations are known per se and the present disclosure may be utilised irrespective of the type of combination.

The internal combustion engine 2 is accompanied with an ICE torque curve TC1 and the electric machine 3 is accompanied with an EM torque curve TC2. The ICE torque curve TC1 is one embodiment of a primary power torque curve TC1 when the primary power source 2 is an internal combustion engine (ICE). The EM torque curve TC2 is one embodiment of a secondary power torque curve TC2 when the secondary power source 3 is an electric machine (EM). Generally a torque curve (i.e. either an ICE torque curve TC1 or an EM torque curve TC2 in the present embodiment) is a curve which shows the maximal torque that can be delivered by the specific power source at a specific rotational speed of the power source. Examples of such torque curves are disclosed in FIGS. 3a-c which will be discussed in more detail below. Torque (T, in newton meters, Nm) is represented on the vertical axis and rotational speed (N, in rounds per minute, rpm) is represented on the horizontal axis of the diagram.

Figure 2:
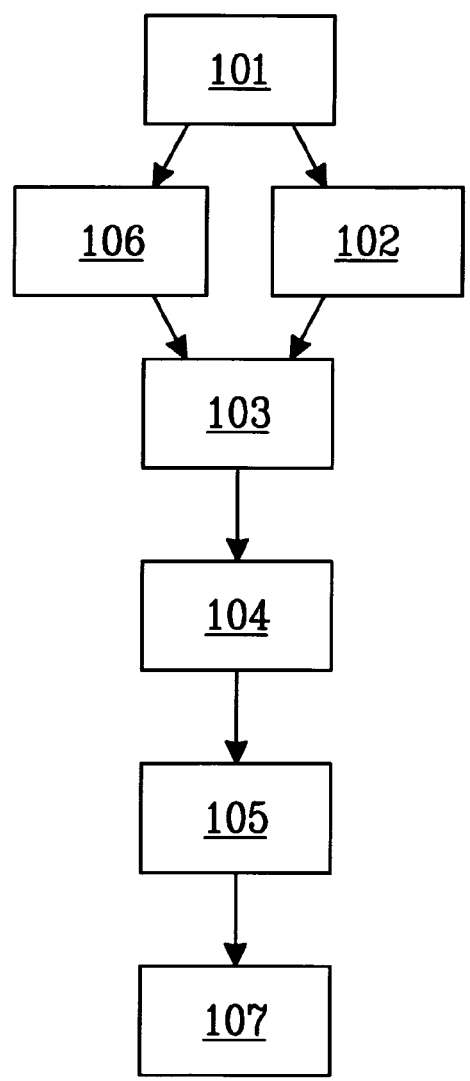
FIG. 2 is a flow-chart disclosing the method according to one embodiment of the invention.

The method according to the present disclosure will be described in more detail in the following with reference to FIG. 2. The method can be performed or controlled by a controller which is not further discussed and which is known per se. The controller may be part of a control unit already included in the vehicle and adapted to control e.g. the engaging and disengaging of the internal combustion engine 2 and the electric machine 3. Generally, a driver of the vehicle is not involved in activating the performance of the method; it is performed automatically as will be disclosed below.

In general the method includes the following steps:

determining a current driver demand 101, determining a current propulsion adaption condition for the vehicle 102, adjusting the powertrain limit curve A according to a propulsion adaption torque factor TF depending on said current propulsion adaption condition 103, where applicable restricting said current driver demand according to said adjusted powertrain limit curve 104, requesting the powertrain 1 to propel the vehicle according to the thus possibly restricted current driver demand, by transforming said possibly restricted current driver demand into a powertrain torque demand 105, and distributing said powertrain torque demand between the primary power source 2 and the secondary power source 3; 107.

The method is utilised when propelling the vehicle in hybrid mode, i.e. when both the internal combustion engine 2 and the electric machine 3 together propel the vehicle. The torque demanded by the driver, the current driver demand, is generally limited by a powertrain limit curve A if the current driver demand is higher than the powertrain limit curve A at the relevant rotational speed. This limitation, if any, results in the powertrain torque demand. If the current driver demand is lower than the powertrain limit curve A at the relevant rotational speed, no limitation of the current driver demand takes place and the powertrain torque demand equals the current driver demand. The powertrain limit curve A thus, where applicable, limits the torque provided by the powertrain to propel the vehicle (that is to say by the sum of the power delivered by the internal combustion engine 2 and the power delivered by the electric machine 3 in this embodiment). The powertrain torque demand is then distributed between the internal combustion engine 2 and the electric machine 3 with respect to the ICE torque curve TC1 and EM torque curve TC2.

The powertrain limit curve A is generally less than the sum of the ICE torque curve TC1 and the EM torque curve TC2. The sum of the ICE torque curve TC1 and the EM torque curve TC2 is henceforth named maximal sum torque curve B.

A typical embodiment of the present disclosure is that the internal combustion engine 2 is run according to its ICE torque curve TC1, while the electric machine 3 is run at a lower power output than the maximum possible torque output according to its EM torque curve TC2. The torque limitation provided by the powertrain limit curve A is consequently normally achieved through limiting the power output from the electric machine 3. The reason for this situation is that when propelling the vehicle in hybrid mode the total power output, if not limited, i. a. would be too high in relation to other vehicles as discussed earlier, and limiting the power output from the electric machine 3 is simple to accomplish. It is however noticed that in a vehicle which is provided with a primary power source 2 and a secondary power source 3 either one or both of the primary power torque curve TC1 and the secondary power torque curve TC2 may be reduced by the powertrain limit curve A.

The method further comprises determining a prevailing propulsion adaption condition for the vehicle 102 and adjusting the powertrain limit curve A according to a propulsion adaption torque factor TF which depends on the prevailing propulsion adaption condition. The prevailing conditions for the vehicle are thus taken into account to adjust the powertrain limit curve A such that the driver will have more or less power output available for the propulsion of the vehicle.

According to this embodiment the propulsion adaption torque factor TF is designed to generally continuously adjust the powertrain limit curve A depending on the prevailing propulsion adaption condition. During driving of the vehicle the prevailing conditions, such as road gradient or slope, or the number of passengers in a bus adding or removing weight to the vehicle, is continuously or stepwise altered. In order to adapt the propulsion to the prevailing conditions, the propulsion adaption torque factor TF is hence equally designed to apply generally continuously during the driving. This also means that the determination of a prevailing propulsion adaption condition is also generally continuously performed, or at least performed within short intervals, such as at intervals of every 1 second, or 10 seconds. Longer intervals may also apply. The controller may be set by i. a. the vehicle manufacturer to perform the determination at desired time increments.

According to another embodiment the EM torque curve TC2 is reset to the initial or original setting when the prevailing propulsion adaption condition no longer applies. This means that the adjustment which was applied by the propulsion adaption torque factor TF on the powertrain limit curve A is removed. It is expected that the duration of a prevailing propulsion adaption condition according to this embodiment is short in relation to the total propelling time of the vehicle, but this may be otherwise such as when the vehicle is heavily loaded. According to this embodiment the propulsion adaption torque factor TF is consequently designed to have a discontinuous character.

It is noted that in any one of the above disclosed embodiments the adjustment of the powertrain limit curve A may result in an increase of the powertrain limit curve A, such that no limitation of the current driver demand takes place. This will have the result that the powertrain limit curve A at this specific occasion equals the maximal sum torque curve B. It is also noted that there is generally no theoretical lower limit for how low the power-train limit curve A may set, although it seems impractical to reduce the power to zero since it would result in prohibiting the driver from driving the vehicle.

The method can be performed both at a time when the vehicle is standing still or is driving, i.e. is being propelled by the internal combustion engine 2 and the electric machine 3.

Turning again to FIG. 3a, the curves will be described from the bottom to the top. At the bottom there is an EM torque curve TC2 which generally corresponds to a maximum deliverable torque curve for the electric machine 3. The next curve is the ICE torque curve TC1 which is a maximum deliverable torque curve for the internal combustion engine 2. Second to the top the powertrain limit curve A is disclosed. According to the disclosure the powertrain limit curve A is adjustable and is thus not fixed as the other three curves in this diagram. In this embodiment the powertrain limit curve A corresponds to a curve which is reduced in relation to the sum of the ICE torque curve TC1 and the EM torque curve TC2. At the top the maximal sum torque curve B is disclosed. This is thus the maximum torque output which is deliverable by the internal combustion engine 2 and the electric machine 3 together. The ICE torque curve TC1 as well as the EM torque curve TC2 and the power-train limit curve A may have different curvatures in relation to what is disclosed here, wholly or partially.

Figure 3C:
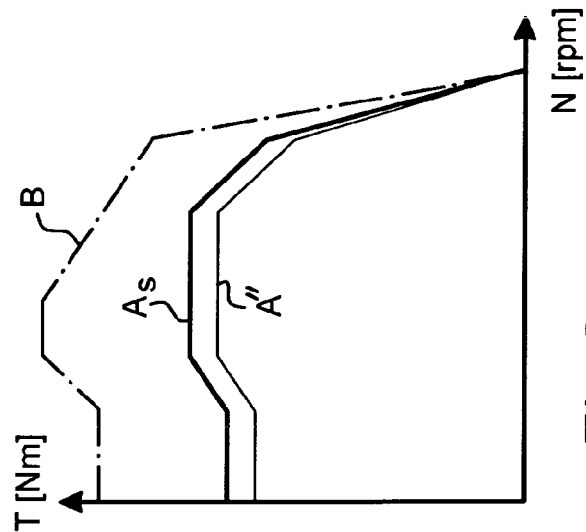
FIGS. 3a-c are schematical diagrams showing torque curves according to one embodiment of the invention.
Figure 3B:
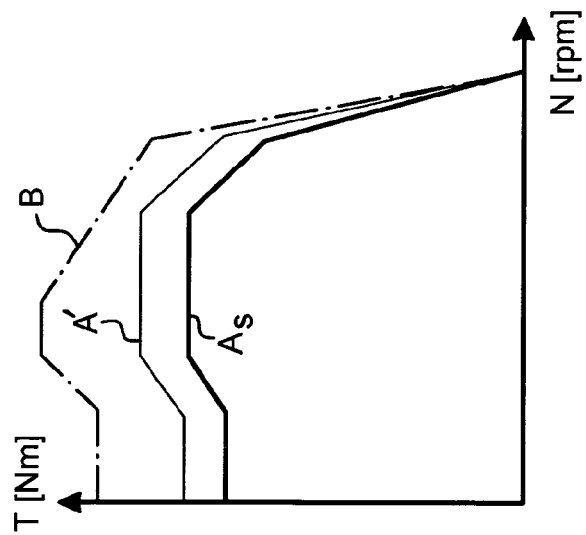
Figure 3A:
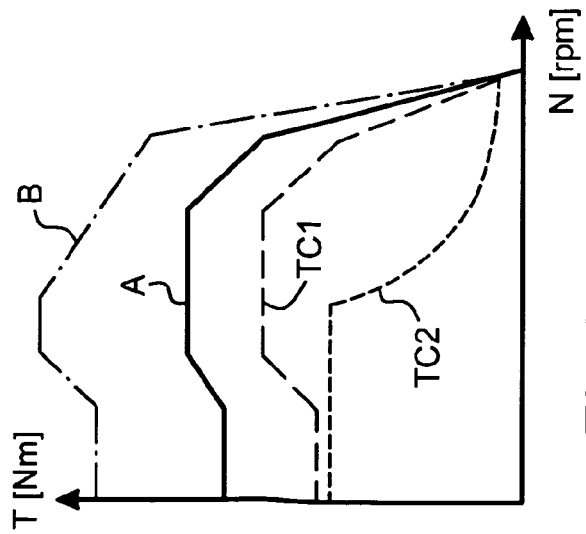

It can be seen from FIG. 3a that according to this embodiment the powertrain limit curve A which is used for propelling the vehicle has the same curvature as the ICE torque curve TC1. It can also be seen that the maximal sum torque curve B has a different curvature from the ICE torque curve TC1 starting from a rotational speed for which the EM torque curve TC2 starts to decrease from a constant level.

In FIGS. 3b and 3c only a powertrain limit curve A which is used for normal driving conditions, henceforth called a standard powertrain limit curve As, is disclosed in relation to the maximal sum torque curve B. The standard powertrain limit curve As may be used when no current propulsion adaption condition is determined. In FIG. 3b the powertrain limit curve A' has been adjusted to be higher than the standard powertrain limit curve depending on the propulsion adaption torque factor TF depending in turn on said current propulsion adaption condition. The adjusted powertrain limit curve A' is still however lower than the maximal sum torque curve B. Contrary to what is disclosed in FIG. 3b, the adjusted powertrain limit curve A" in FIG. 3c is lower than both the standard powertrain limit curve As and the maximal sum torque curve B. It is noted that the powertrain limit curves A, As, A' and A" may have other shapes and other locations in relation to the maximal sum torque curve B.

Figure 4:
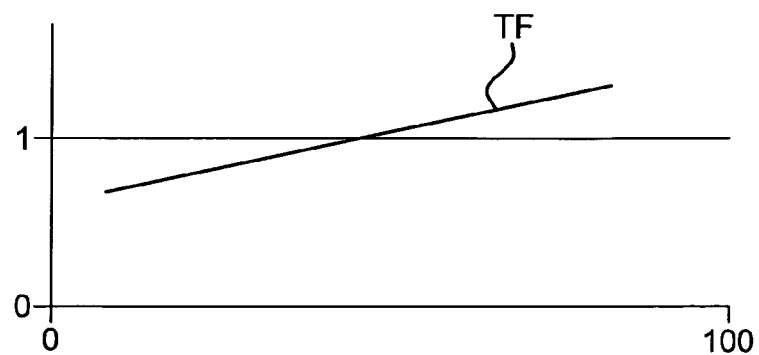
FIG. 4 is a schematical diagram showing a propulsion adaption torque factor according to one embodiment of the invention.

Turning now to FIG. 4 an embodiment of a propulsion adaption torque factor TF is disclosed. In this embodiment the propulsion adaption torque factor TF is a generally straight line and could thus also be described as a scaling factor TF. The scaling factor TF is shown on the vertical axis and the horizontal axis shows an indexed function of the prevailing propulsion adaption condition. The propulsion adaption torque factor TF is in FIG. 4 a function of grade, i.e. whether the vehicle is located in a slope, and of mass, i.e. how heavily loaded the vehicle is. The scaling factor TF is 1 when the vehicle is driving on a generally flat road and has a payload in relation to its dead weight which is found "normal". This is thus equal to the use of the standard powertrain limit curve As. This also represents an index of 50 and a scaling factor of I. At a higher index the scaling factor TF is higher than 1, i.e. that the (adjusted) powertrain limit curve A' has a higher value than the standard powertrain limit curve As as in FIG. 3b. Similarly, at an index lower than 50, the (adjusted) powertrain limit curve A" has a value which is lower than the standard power-train limit curve As as in FIG. 3c. The propulsion adaption torque factor TF is consequently a function of the prevailing propulsion adaption condition.

Figure 5:
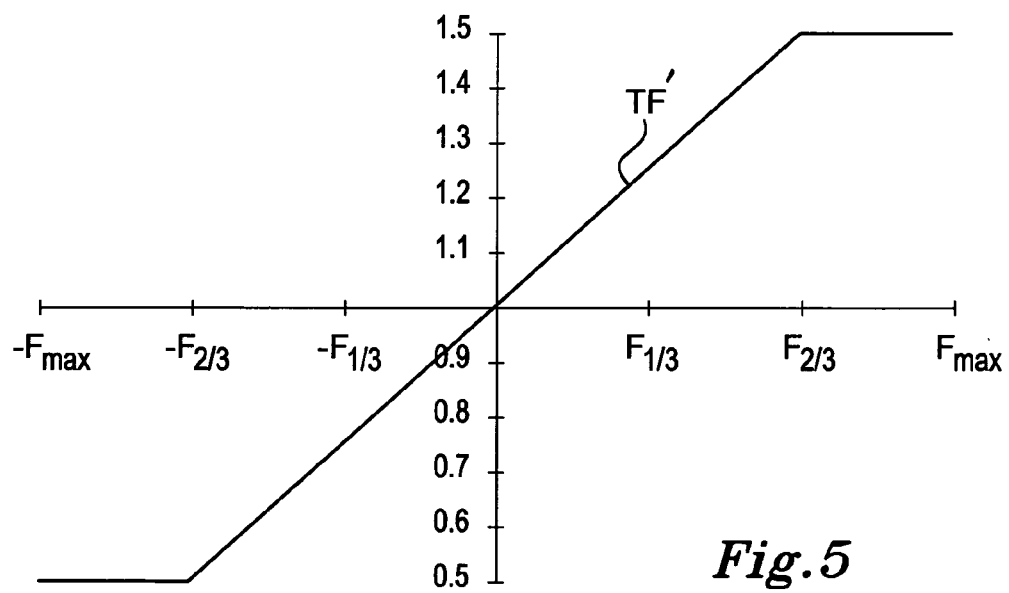
FIG. 5 is a schematical diagram showing a propulsion adaption torque factor according to another embodiment of the invention.

FIG. 5 discloses an alternative embodiment of the propulsion adaption torque factor TF'. Here the curve has a straight course during certain load situations, and has a constant value at other load situations. The scaling factor TF' is shown on the vertical axis and the horizontal axis shows a function of the prevailing propulsion adaption condition expressed as a load situation. A load situation which is found "normal" is located at the intersection between the vertical and the horizontal axes and corresponds to a scaling factor of 1. On the right hand side of the vertical axis, representing a larger load on the vehicle than deemed "normal" the scaling factor TF' is higher than 1 and increases up to a load situation of ⅔ of maximum applicable load. Thereafter the scaling factor TF' remains constant at 1.5. Similarly, at the left hand side of the vertical axis, representing a smaller load than "normal", the scaling factor TP is lower than 1 and decreases continuously down to a load situation of ⅔ of minimum applicable load. Thereafter the scaling factor TF' remains constant at 0.5.

It should be noted that the standard powertrain limit curve As may not necessarily be a fixed curve. The standard powertrain limit curve As may be a function of prevailing parameters other than the discussed rotational speed, such that the curvature may be adapted also during "normal" driving, i.e. at times without any prevailing adaption conditions. Such other parameters may include engine parameters. In such a case the step of adjusting the powertrain limit curve A according the method as disclosed herein 103 is preceded by, or at least combined with, the step of adjusting the standard powertrain limit curve As according to any such additional prevailing parameters. In other words, under these conditions the vehicle is propelled according to the standard powertrain limit curve As unless it is determined 106 that there are prevailing parameters that adjusts the standard powertrain limit curve As. This adjusted standard powertrain limit curve As is then also adjusted depending on the presence of any prevailing propulsion adaption conditions. These additional prevailing parameters are consequently different from the prevailing propulsion adaption conditions as disclosed below. The vehicle is thus propelled by an adjusted powertrain limit curve A which is adjusted for at least two reasons. The current driver demand is in turn restricted 104 where applicable according to said twice adjusted powertrain limit curve A.

Examples of prevailing propulsion adaption conditions are any one or a combination of the following: determining that the vehicle is located in or at a slope (upward or down slope), determining a loading situation of the vehicle, or determining that the vehicle is being ahead of or belated in relation to a desired schedule 102.

Determination of that the vehicle is located in or at a slope may be achieved through the use of a Global Positioning System (GPS) in combination with a map or similar database comprising altitude information, thereby knowing where the vehicle is presently located and its immediate conditions at its location or just in front of the vehicle. The geographical information in the GPS may either include topographical information or have such information in a parallel system. One way to acquire topographical information is through driving a certain path and storing the information on a suitable medium in the vehicle. A GPS system is merely one embodiment of a vehicle navigation system, and any such system providing location information for the vehicle is suitable to perform the disclosed method.

Another manner to determine that the vehicle is located in a slope is through the use of an inclination sensor. An inclination sensor is one embodiment of inclination detecting means. Such an inclination sensor may in principle be located at any point in the vehicle, but an advantageous location is at a point where there is little sway or wobble. This is generally found at a middle-point in the vehicle along its longitudinal as well as transversal direction.

Typical upward slopes for which additional power may be needed from the electric machine 3 are slopes of more than 10% angle or more if driving a fully loaded city buss of 18 tonnes and having for example an 8 litre turbo-charged diesel engine. Downward slopes for which reduced power may be made available for propulsion of the vehicle are any slopes. Less power output may be made available for propulsion of the vehicle already from slight slopes since a downward slope as such may aid keeping the vehicle speed up.

Determination of a loading situation of the vehicle, such as being more or less heavily loaded, may be achieved through the use of gauges that are connected directly to the wheel suspension and which measure the pressure and consequently the aggregate of dead weight and any added payload, i.e. the total weight of the vehicle. The dead weight of the vehicle is known, and by a determination of total weight of the vehicle and subtracting the known dead weight, the added payload may be estimated.

On a vehicle which is provided with an air-suspension, bellows are located between the vehicle chassis and the wheel axles. The air pressure in these bellows may be measured through pressure sensors as a measure of vehicle weight and consequently of added payload. Although this method is simple, most vehicles are not provided with air-suspension. Instead a potentiometer or similar gauge may be located against leaf springs or helical springs, which today represent the most common suspension type. Such potentiometers are simple yet robust and cheap gauges and provide an effective means for estimating payload.

The total weight of the vehicle, including the added payload, may be calculated through Newton's second law of motion: force equals mass multiplied by acceleration. The vehicle speed and acceleration are already known through other means in the control system of the vehicle. The road inclination may be known from an inclination sensor as already described. The effect delivered from the powertrain to the driven wheels may already be known through the control system of the vehicle. This method demands that the vehicle is driven to perform the calculation. It may take a short while to reach a stable value on the calculated total weight and consequently on the calculated payload. This method may also be used as complement to other known methods to perform accurate payload estimation.

Typical payloads of a vehicle may be 30% in relation to its dead weight. Other examples are 50% or 70%.

Determination of that the vehicle is ahead of or belated in relation to a desired schedule can be achieved through the use of a vehicle navigation system such as a GPS system in combination with memory means for keeping track of the intended or desired driving schedule. The desired driving schedule may be provided with desired vehicle location information at mile stones along a desired driving route, or as a more continuous de sired driving route. If and when the vehicle is ahead of or belated in relation to the desired schedule according to the desired driving route the method according to the disclosure may be engaged to reduce or release more energy, such that the vehicle may e.g. catch up in relation to the desired schedule if it is late.

The person skilled in the art will realise that many alterations and modifications may be made to the present disclosure as disclosed hereinabove, without deviating from the scope of protection of the appended claims. Different embodiments of the present disclosure may be combined together in other ways than those described. The propulsion adaption torque factor TF may e.g. have different curvatures than those herein disclosed, such as being other than a straight line, being stepwise continuous or having a progressive path.

The invention claimed is:

1. A method for propelling a vehicle having a powertrain comprising a primary power source accompanied with a primary power torque curve and a secondary power source accompanied with a secondary power torque curve, the primary power source being adapted to deliver a maximum torque output in relation to rotational speed according to the primary power torque curve and the secondary power source being adapted to deliver a maximum torque output in relation to rotational speed according to the secondary power torque curve, the vehicle being adapted to be propelled by either one of the primary power source and the secondary power source or by both together, the powertrain further comprising a powertrain limit curve which is adapted to where applicable restrict a current driver demand from a driver of the vehicle in relation to the primary power torque curve and the secondary power torque curve when propelling the vehicle, the method comprising when propelling the vehicle by both the primary power source and the secondary power source:
   determining a current driver demand,
   determining a current propulsion adaption condition for the vehicle,
   adjusting the powertrain limit curve according to a propulsion adaption torque factor depending on the current propulsion adaption condition,
   where applicable restricting the current driver demand according to the adjusted powertrain limit curve, and
   requesting, the powertrain to propel the vehicle according to the thus possibly restricted current driver demand.

2. The method according to claim 1, wherein the powertrain limit curve is used on the secondary power source.

3. The method according to claim 1, wherein the propulsion adaption torque factor is a scaling factor being a function of the prevailing propulsion adaption condition.

4. The method according to claim 3, wherein the scaling factor is stepwise linear.

5. The method according to claim 1, wherein the step of requesting the powertrain to propel the vehicle according to the thus possibly restricted current driver demand involves transforming the possibly restricted current driver demand into a powertrain torque demand.

6. The method according to claim 5, wherein the method further comprises distributing the powertrain torque demand between the primary power source and the secondary power source.

7. The method according to claim 1. further comprising resetting the powertrain limit curve when the prevailing propulsion adaption condition is terminated.

8. The method according to claim 1, wherein the step of determining a current propulsion adaption condition for the vehicle comprises detecting any one or a combination of the following: detecting that the vehicle is located in or at a slope, detecting a loading situation of the vehicle, and detecting that the vehicle is being ahead of or belated in relation to a desired schedule.

9. The method according to claim 8, in which the step of detecting that the vehicle is located in or at a slope involves using inclination detecting means and detecting if the inclination sensing means detect an upward slope being equal to or greater than a predetermined inclination value.

10. The method according to claim 9, in which the predetermined inclination value corresponds to an upward slope of at least 7.5%.

11. The method according to claim 8, in which the step of detecting a loading situation of the vehicle involves using weight sensing means and detecting that the weight sensing means detect a payload in the vehicle being equal or greater than a predetermined weight value.

12. The method according to claim 11, in which the predetermined weight value corresponds to a payload of at least 30% in relation to a vehicle dead weight.

13. A vehicle having a powertrain comprising a primary power source accompanied with a primary power torque curve and a secondary power source accompanied with a secondary power torque curve, the primary power source being adapted to deliver a maximum torque output in relation to rotational speed according to the primary power torque curve and the secondary power source being adapted to deliver a maximum torque output in relation to rotational speed according to the secondary power torque curve, the vehicle being adapted to be propelled by either one of the primary power source and the secondary power source or by both together, the powertrain further comprising a powertrain limit curve which is adapted to where applicable restrict a current driver demand from a driver of the vehicle in relation to the primary power torque curve and the secondary power torque curve when propelling the vehicle, the vehicle being adapted to perform a method for propelling the vehicle, the method comprising when propelling the vehicle by both the primary power source and the secondary power source:
   determining a current driver demand,
   determining a current propulsion adaption condition for the vehicle,
   adjusting the powertrain limit curve according to a propulsion adaption torque factor depending on the current propulsion adaption condition,
   where applicable restricting the current driver demand according to the adjusted powertrain limit curve, and
   requesting the powertrain to propel the vehicle according to the thus possibly restricted current driver demand.

14. The vehicle according to claim 13, in which the primary power source is an internal combustion engine.

15. The vehicle according to claim 13, in which the secondary power source is an electric machine.

* * * * *